(12) United States Patent
Xue et al.

(10) Patent No.: US 10,823,544 B2
(45) Date of Patent: Nov. 3, 2020

(54) HEIGHT DIFFERENCE GAUGE

(71) Applicant: CITIC Dicastal CO., LTD., Qinhuangdao, Hebei (CN)

(72) Inventors: Bowen Xue, Qinhuangdao (CN); Ruisong Tong, Qinhuangdao (CN); Sheng Zhang, Qinhuangdao (CN); Jiandong Guo, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 181 days.

(21) Appl. No.: 16/257,229

(22) Filed: Jan. 25, 2019

(65) Prior Publication Data

US 2019/0353470 A1 Nov. 21, 2019

(30) Foreign Application Priority Data

May 21, 2018 (CN) .......................... 2018 1 0488744

(51) Int. Cl.
*G01B 5/06* (2006.01)

(52) U.S. Cl.
CPC .................................... *G01B 5/061* (2013.01)

(58) Field of Classification Search
CPC ......... G01B 5/061; G01B 5/063; G01B 5/065
USPC .................................. 33/700, 783, 832, 833
See application file for complete search history.

(56) References Cited

U.S. PATENT DOCUMENTS

| 4,894,920 A * | 1/1990 | Butler | G01B 3/22 |
| | | | 33/203.11 |
| 2007/0039197 A1* | 2/2007 | Holec | G01B 5/0025 |
| | | | 33/784 |
| 2007/0245586 A1* | 10/2007 | Zanier | G01B 5/061 |
| | | | 33/832 |
| 2009/0094851 A1* | 4/2009 | Xiao | G01B 3/22 |
| | | | 33/832 |
| 2018/0023945 A1* | 1/2018 | Mariller | G01B 5/14 |
| | | | 33/832 |
| 2018/0202898 A1* | 7/2018 | Xue | B62D 65/005 |
| 2020/0003537 A1* | 1/2020 | Xue | G01B 5/061 |
| 2020/0003540 A1* | 1/2020 | Xue | G01B 5/061 |
| 2020/0191544 A1* | 6/2020 | Xue | B60T 17/221 |

FOREIGN PATENT DOCUMENTS

| CN | 201548160 U | 8/2010 |
| CN | 103017627 A | 4/2013 |
| CN | 204388764 U | 6/2015 |
| CN | 205262349 U | 5/2016 |
| CN | 105890499 A | 8/2016 |
| CN | 106052508 A | 10/2016 |
| CN | 206378086 U | 8/2017 |
| CN | 208139994 U | 11/2018 |

OTHER PUBLICATIONS

First Office Action of CN application No. 201810488744.0, dated Jun. 3, 2019, 14 pgs.

* cited by examiner

*Primary Examiner* — George B Bennett
(74) *Attorney, Agent, or Firm* — Cooper Legal Group, LLC

(57) ABSTRACT

A height difference gauge includes a base plate, a sliding sleeve, a guide sleeve, a measuring column, a positioning cone, a positioning sleeve, a spring. The height difference gauge can be used for measuring the relative height difference of two planes, and has the characteristics of strong versatility, high detection precision, simple structure, low manufacturing cost, convenient operation and the like.

2 Claims, 1 Drawing Sheet

HEIGHT DIFFERENCE GAUGE

CROSS-REFERENCE TO RELATED APPLICATIONS

The present application claims benefit of Chinese Patent Application No. 201810488744.0, filed on May 21, 2018, the contents of which are hereby incorporated by reference in its entirety.

BACKGROUND

In the field of machining, especially in the field of machining of automobile steering knuckles, the relative height difference between two machined surfaces, e.g., the height difference of the flange face of a steering knuckle relative to a caliper hole mounting surface, needs to be controlled in many cases. The conventional way is to use three coordinates for sampling detection, but the efficiency is very low. Therefore, a general-purpose gauge is required to detect elements to be measured having height difference; and the gauge can be adjusted according to the actual position of a point to be measured.

SUMMARY

The present disclosure relates to a gauge, specifically to a height difference gauge.

The objective of the present disclosure is to provide a height difference gauge, which can be used for measuring the relative height difference of two planes.

In order to achieve the above objective, the technical solution of the present disclosure is: a height difference gauge includes a base plate, a sliding sleeve, a vertical set screw, a guide sleeve, a measuring column, a left jack screw, a positioning cone, a positioning sleeve, a right jack screw, a spring, a transverse set screw; the upper part and sides of the base plate are provided with elongated grooves; the sliding sleeve is in clearance fit with the grooves of the base plate; the outer side of the guide sleeve is in clearance fit with the inner side of the sliding sleeve, and the fit clearance is not more than 0.01 mm; the vertical set screw is mounted above the sliding sleeve, and the top end thereof is in contact with the outer side of the guide sleeve; the measuring column is in clearance fit with the inner hole of the guide sleeve, and the fit clearance is not more than 0.01 mm; the left jack screw is mounted above the guide sleeve, and the top end thereof fits with a groove of the measuring column; the positioning sleeve is mounted on the right side above the base plate; the positioning cone is in clearance fit with the positioning sleeve; the right jack screw is mounted in the positioning sleeve, and the top end thereof fits with a groove of the positioning cone; the spring is mounted inside the positioning sleeve and placed at the top end of the positioning cone; the transverse set screw penetrates through the grooves on the sides of the base plate, and the top end thereof fits with a threaded hole on the side of the sliding sleeve.

The upper end surface of the guide sleeve is stepped, and the height of the steps is the tolerance of the measured height difference; the edges of the inner hole of the upper end surface of the guide sleeve are of sharp angles; the lower end surface of the measuring column is tapered, and the edges of the upper end surface are of sharp angles. The lower end of the positioning cone is tapered and the upper end is cylindrical.

During operation, the taper at the lower end of the positioning cone fits with a hole in the high surface of a workpiece, the base plate is pressed down, and the spring is compressed till the lower end surface of the base plate is completely flush with the high surface of the workpiece; the horizontal position of the sliding sleeve is adjusted via the transverse set screw according to the position of a measured point on the low surface; the heights of the guide sleeve and the measuring column are adjusted via the vertical set screw according to the measured height difference; when the top surface of the measuring column is flush with the high surface of the top end of the guide sleeve, the height difference between the lower end surface of the measuring column and the lower end surface of the base plate is the lower difference of the measured height difference; and if the edge of the top end of the measuring column is between the steps at the top end of the guide sleeve, the measured height difference is qualified.

The height difference gauge can be used for measuring the relative height difference of two planes, and has the characteristics of strong versatility, high detection precision, simple structure, low manufacturing cost, convenient operation and the like.

LIST OF REFERENCE SYMBOLS

Figure 1:
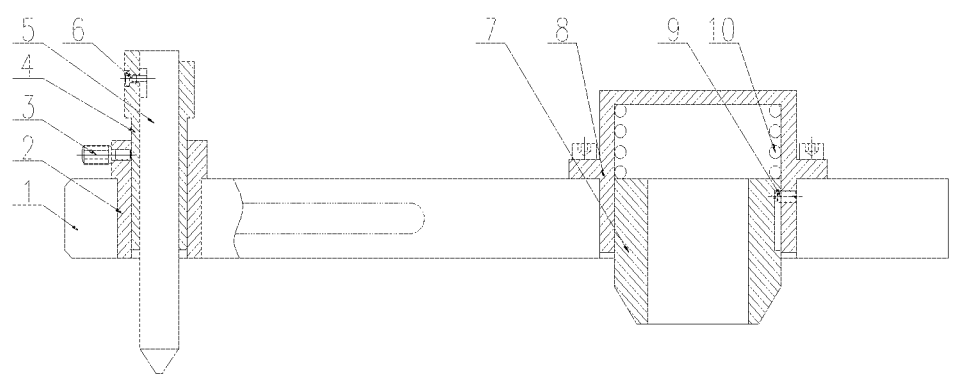
FIG. 1 is a front view of a height difference gauge according to the present disclosure.
Figure 2:
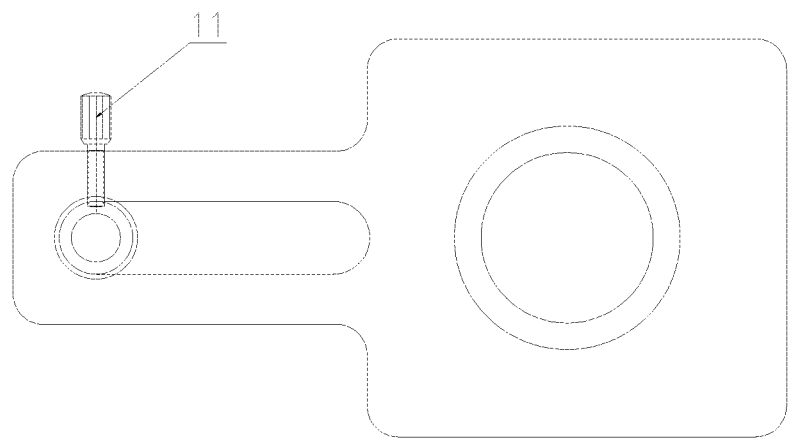
FIG. 2 is a top view of the height difference gauge according to the present disclosure.

1—base plate, 2—sliding sleeve, 3—vertical set screw, 4—guide sleeve, 5—measuring column, 6—left jack screw, 7—positioning cone, 8—positioning sleeve, 9—right jack screw, 10—spring, 11—transverse set screw.

DETAILED DESCRIPTION

The details and working conditions of the specific device according to the present disclosure will be described below in combination with the drawings.

The device includes a base plate 1, a sliding sleeve 2, a vertical set screw 3, a guide sleeve 4, a measuring column 5, a left jack screw 6, a positioning cone 7, a positioning sleeve 8, a right jack screw 9, a spring 10, a transverse set screw 11; the upper part and sides of the base plate 1 are provided with elongated grooves; the sliding sleeve 2 is in clearance fit with the grooves of the base plate 1; the outer side of the guide sleeve 4 is in clearance fit with the inner side of the sliding sleeve 2, and the fit clearance is not more than 0.01 mm; the vertical set screw 3 is mounted above the sliding sleeve 2, and the top end thereof is in contact with the outer side of the guide sleeve 4; the measuring column 5 is in clearance fit with the inner hole of the guide sleeve 4, and the fit clearance is not more than 0.01 mm; the left jack screw 6 is mounted above the guide sleeve 4, and the top end thereof fits with a groove of the measuring column 5; the positioning sleeve 8 is mounted on the right side above the base plate 1; the positioning cone 7 is in clearance fit with the positioning sleeve 8; the right jack screw 9 is mounted in the positioning sleeve 8, and the top end thereof fits with a groove of the positioning cone 7; the spring 10 is mounted inside the positioning sleeve 8 and placed at the top end of the positioning cone 7; the transverse set screw 11 penetrates through the grooves on the sides of the base plate 1, and the top end thereof fits with a threaded hole on the side of the sliding sleeve 2.

The upper end surface of the guide sleeve 4 is stepped, and the height of the steps is the tolerance of the measured height difference; the edges of the inner hole of the upper end surface of the guide sleeve 4 are of sharp angles; the lower end surface of the measuring column 5 is tapered, and the edges of the upper end surface are of sharp angles. The lower end of the positioning cone 7 is tapered and the upper end is cylindrical.

During operation, the taper at the lower end of the positioning cone 7 fits with a hole in the high surface of a workpiece, the base plate 1 is pressed down, and the spring 10 is compressed till the lower end surface of the base plate 1 is completely flush with the high surface of the workpiece; the horizontal position of the sliding sleeve 2 is adjusted via the transverse set screw 11 according to the position of a measured point on the low surface; the heights of the guide sleeve 4 and the measuring column 5 are adjusted via the vertical set screw 3 according to the measured height difference; when the top surface of the measuring column 5 is flush with the high surface of the top end of the guide sleeve 4, the height difference between the lower end surface of the measuring column 5 and the lower end surface of the base plate 1 is the lower difference of the measured height difference; and if the edge of the top end of the measuring column 5 is between the steps at the top end of the guide sleeve 4, the measured height difference is qualified.

The invention claimed is:

1. A height difference gauge comprising a base plate, a sliding sleeve, a vertical set screw, a guide sleeve, a measuring column, a left jack screw, a positioning cone, a positioning sleeve, a right jack screw, a spring, a transverse set screw, wherein the upper part and sides of the base plate are provided with elongated grooves; the sliding sleeve is in clearance fit with the grooves of the base plate; the outer side of the guide sleeve is in clearance fit with the inner side of the sliding sleeve, and the fit clearance is not more than 0.01 mm; the vertical set screw is mounted above the sliding sleeve, and the top end thereof is in contact with the outer side of the guide sleeve; the measuring column is in clearance fit with the inner hole of the guide sleeve, and the fit clearance is not more than 0.01 mm; the left jack screw is mounted above the guide sleeve, and the top end thereof fits with a groove of the measuring column; the positioning sleeve is mounted on the right side above the base plate; the positioning cone is in clearance fit with the positioning sleeve; the right jack screw is mounted in the positioning sleeve, and the top end thereof fits with a groove of the positioning cone; the spring is mounted inside the positioning sleeve and placed at the top end of the positioning cone; the transverse set screw penetrates through the grooves on the sides of the base plate, and the top end thereof fits with a threaded hole on the side of the sliding sleeve.

2. The height difference gauge according to claim 1, wherein the upper end surface of the guide sleeve is stepped, and the height of the steps is the tolerance of the measured height difference; the edges of the inner hole of the upper end surface of the guide sleeve are of sharp angles; the lower end surface of the measuring column is tapered, and the edges of the upper end surface are of sharp angles; the lower end of the positioning cone is tapered and the upper end is cylindrical.

* * * * *